INVENTOR.
ALVA I. ARCHER
BY Bruce C Lutz
ATTORNEY

INVENTOR.
ALVA I. ARCHER
BY Bruce C Lutz
ATTORNEY

United States Patent Office 3,475,735
Patented Oct. 28, 1969

3,475,735
SEMICONDUCTOR MEMORY

Alva I. Archer, Clearwater, Fla., assignor to Honeywell Inc., Minneapolis, Minn., a corporation of Delaware

Filed May 9, 1967, Ser. No. 637,166
Int. Cl. G11b *5/62*
U.S. Cl. 340—173 12 Claims

ABSTRACT OF THE DISCLOSURE

A semiconductor integrated memory using controlled switches in combination with transistors as the storage, read, and write elements.

Summary of the invention

Various types of memory devices are known in the prior art. Magnetic devices are widely used in memories, but for some applications the performance of magnetic devices is only marginally satisfactory. For example, where large temperature variations are encountered, the temperature of a magnetic memory will generally have to be controlled. Where space and weight are at a premium, temperature control elements and circuitry are undesirable. Temperature control also requires large amounts of power.

Semiconductor devices could be used as memories, but usually a semiconductor memory of discrete components will be too large physically even for moderate size memories. Furthermore, most semiconductor memories are not capable of being read nondestructively.

This invention provides a semiconductor integrated memory which overcomes many of the disadvantages of the prior art magnetic and semiconductor memories. Since the memory is in integrated form, it is quite small so that if temperature stabilization is required, the amount of power needed to stabilize the temperature will be much less than with prior art memories. Since less power is being handled, the control circuitry usually can be less bulky. Furthermore, as the memory is in integrated form, it has all of the inherent advantages of integrated circuits such as small size, low power, reliability, low cost, etc.

The basic element of an integrated memory constructed in accordance with this invention is a four-layer controlled switch which has first and second layers disposed in electrically operable relationships, a third layer diffused into the second layer, and a fourth layer diffused into the third layer, together with a current control device, which operates substantially like a transistor, positioned adjacent to the four-layer device with the second layer of the four-layer device in common with the control region of the current control device. These basic elements are grouped by three's into memory locations. The three basic elements are interconnected such that one element controls writing into the memory location, the second element controls nondestructive reading of information from the memory location, and the third element stores information. The memory locations are interconnected to provide a memory array. Another feature of integrated structure constructed in accordance with this invention is that the first layer of the four-layer devices is in common with one layer of the current control devices.

Accordingly, it is the object of this invention to provide a new and novel semiconductor integrated memory.

Figure 1:
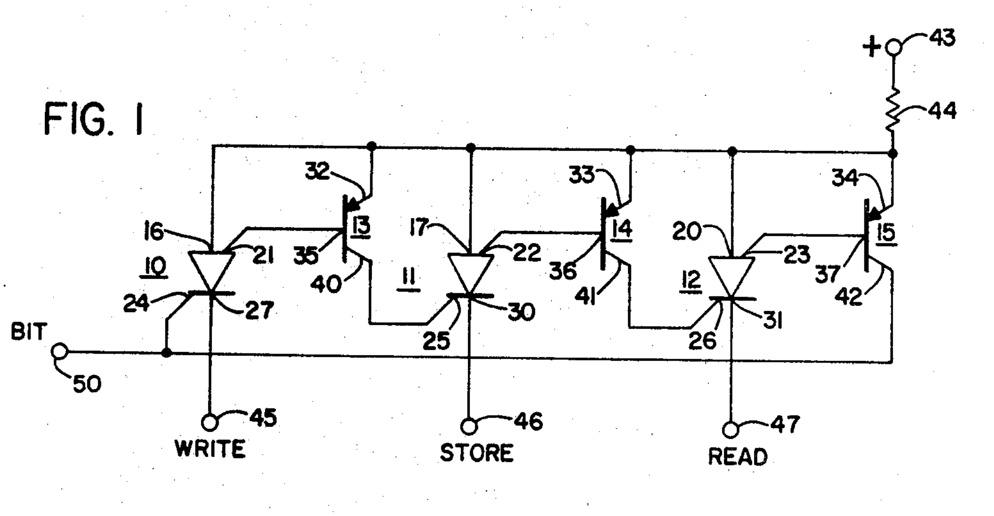
FIGURE 1 is a circuit schematic of one memory location.

This object and other objects and advantages of this invention will become evident to those skilled in the art upon the reading of this specification and the appended claims in conjunction with the drawings, of which:

Structure of FIGURE 1

In FIGURE 1 there are shown four-layer devices, silicon controlled rectifiers, or controlled switches 10, 11 and 12 which will hereinafter be called switches. Also shown are three-layer devices, current control devices, or transistor means 13, 14, and 15 which will hereinafter be referred to as transistors. Switches 10, 11, and 12 each have first layers or anodes 16, 17, and 20, respectively; second layers, output means, or gates 21, 22, and 23, respectively; third layers, input means or gates 24, 25, and 26, respectively; and fourth layers or cathodes 27, 30, and 31 respectively. Transistors 13, 14 and 15 each have common means or emitters 32, 33, and 34, respectively; input means, control means, or bases 35, 36, and 37, respectively; and output means or collectors 40, 41, and 42, respectively. Gate 21 of switch 10 is connected to base 35 of transistor 13; collector 40 of transistor 13 is connected to gate 25 of switch 11; gate 22 of switch 11 is connected to base 36 of transistor 14; collector 41 of transistor 14 is connected to gate 26 of switch 12; and gate 23 of switch 12 is connected to base 37 of transistor 15.

An energization means or positive potential supplying means 43 is connected to one end of a resistance means or resistor 44, the other end of which is connected in common to anodes 16, 17, and 20 and emitters 32, 33, and 34. A terminal 45 labeled WRITE is connected to cathode 27 of switch 10. A terminal 46 labeled STORE is connected to cathode 30 of switch 11. A terminal 47 labeled READ is connected to cathode 31 of switch 12. A terminal 50 labeled BIT is connected to gate 24 of switch 10 and to collector 42 of transistor 15.

Transistors 13, 14, and 15 are PNP transistors. Switches 10, 11, and 12 are PNPN devices. That is, the anodes of the switches are P-type semiconductor material and the cathodes are N-type semiconductor material. An N-type gate and a P-type gate are positioned between the anode and cathode. It is to be understood that the particular type of semiconductor material used for the various layers can be varied without departing from the spirit and scope of this invention.

Operation of FIGURE 1

To understand the operation of FIGURE 1, first assume that all of terminals 45, 46, and 47 are either open circuited or at sufficient positive potential so that switches 10, 11, and 12 cannot conduct. Also assume that terminal 50 is at ground potential. Since anodes 16, 17, and 20 are P-type material and gates 21, 22, and 23 are N-type material, gates 21, 22 and 23 will be at approximately the same potential as the anodes. Thus, there will not be sufficient voltage drop between the anodes and gates to switch transistors 13, 14, and 15 ON.

When information is stored in the memory location terminal 46 is grounded so that switch 11 can conduct. As a matter of definition, assume that when switch 11 is conducting a "1" is stored and that when switch 11 is nonconducting a "0" is stored.

The first step in storing information is to raise the potential of terminal 46 or open circuit terminal 46 so that switch 11 is extinguished if it was conducting. Next, terminal 45 is grounded so that switch 10 can conduct. If a binary "1" is to be stored, terminal 50 is raised to a sufficiently positive potential to cause switch 10 to conduct. When switch 10 conducts, gate 21 is lowered in potential to switch transistor 13 ON. At this point terminal 50 may be lowered in potential to ground and switch 10 will remain conductive. The next step in storing information is to ground terminal 46. Since transistor 13 is ON, current will flow from collector 40 to gate 25 to cause switch 11 to conduct thereby storing a "1." Terminal 45 is now open circuited or raised in potential to extinguish switch 10.

If a "0" is to be stored in the memory location, the procedure is the same except that terminal 50 is not raised in potential so that switch 10 does not conduct and transistor 13 does not switch ON. Thus, switch 11 will remain nonconducting and a "0" will be stored.

To read information from the memory location, terminal 47 is grounded. If a "1" is stored, transistor 14 will be ON thereby causing switch 12 to conduct. When switch 12 conducts, transistor 15 is switched ON thereby raising the potential of terminal 50 indicating that a "1" is stored. If a "0" was stored in switch 11, transistor 14 is OFF and switch 12 will not conduct so that transistor 15 remains OFF, terminal 50 will not change potential thereby indicating that a "0" is stored. Since the information stored in switch 11 remains after a read operation, reading is nondestructive.

It is evident that separate terminals could be provided for bit input and output. However, the operations of write and read are never performed at the same time. Thus, one terminal 50 can be used for both bit input and output. Furthermore, when the structure is integrated, one conductor is eliminated which simplifies the placing of conductors on the chip.

It is evident that when one of the switches 10, 11, and 12 is conducting, the anodes 16, 17, and 20 will all be at a low potential since most of the potential of source 43 will be dropped across resistor 44. Thus, to ensure that several switches may conduct simultaneously, it may be desirable or necessary to connect resistors to terminals 45, 46, 47, and 50 either instead of or in addition to resistor 44 so that only part of the potential of source 43 is dropped across resistor 44.

Figure 3:
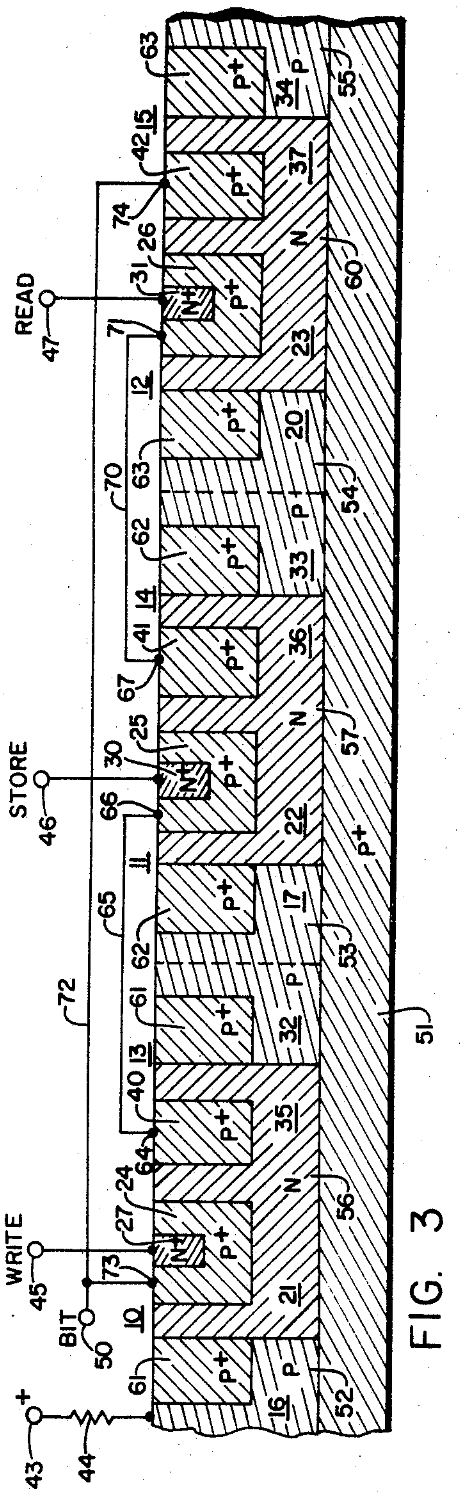
FIGURE 3 is a sectional view of the integrated structure taken along line 3—3 of FIGURE 2.
Figure 2:
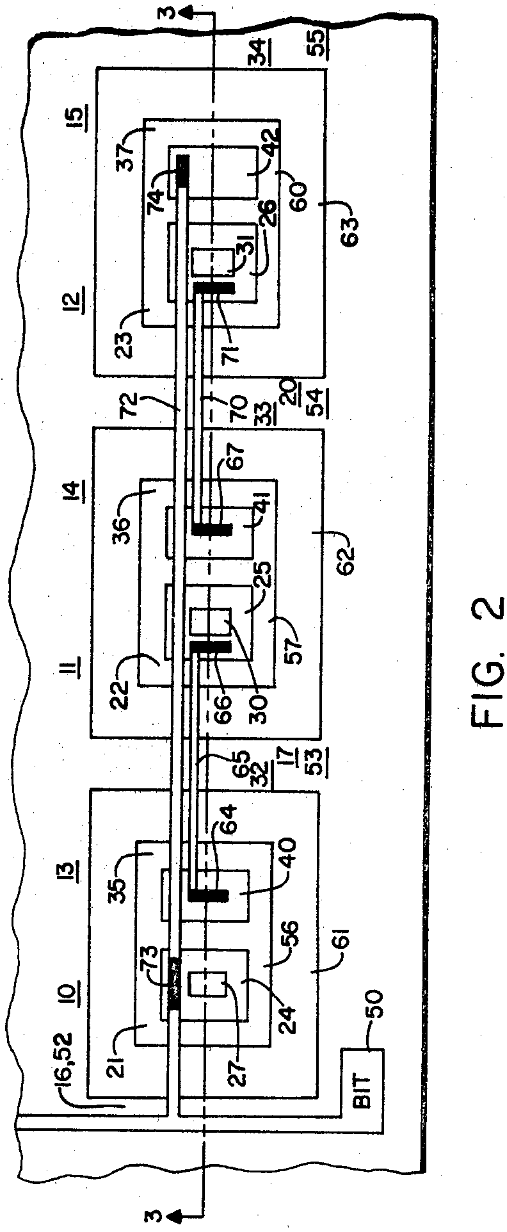
FIGURE 2 is a top view of one memory location in integrated form.

FIGURES 2 and 3

FIGURES 2 and 3 show the circuit of FIGURE 1 in integrated form. The same identifying numbers that were used in FIGURE 1 are used in FIGURES 2 and 3 to show the relationship between the figures. Additional numbers are used for detail not shown in FIGURE 1.

The starting material for making the structure of FIGURES 2 and 3 is a substrate 51 of a material such as heavily doped P-type silicon (P+). The first step in making the integrated structure is to grow epitaxial silicon onto the substrate 51 to establish P-type zones, regions, layers, or areas 52, 53, 54, and 55 and N-type zones, areas, layers, or regions 56, 57 and 60 the N-type zones being formed for example by diffusion of N-type impurities into P-type epitaxial material. Region 56 corresponds to switch 10 and transistor 13 in combination; region 57 corresponds to switch 11 and transistor 14 in combination; and region 60 corresponds to switch 12 and transistor 15 in combination. Region 52 corresponds to layer or anode 16 of switch 10. Region 53 corresponds to layer or emitter 32 of transistor 13 and layer or anode 17 of switch 11. Region 54 corresponds to layer or emitter 33 of transistor 14 and layer or anode 20 of switch 12. Region 55 corresponds to layer or emitter 34 of transistor 15. Note that the anodes of the switches and the emitters of the transistors are in common and that the P-type material surrounds the N-type regions 56, 57, and 60 to isolate each N-type region from every other N-type region. The N-type material of region 56 includes gate 21 of switch 10 in common with base 35 of transistor 13. The N-type material of region 57 includes gate 22 of switch 11 in common with base 36 of transistor 14. The N-type material of region 60 includes gate 23 of switch 12 in common with base 37 of transistor 15. Thus, there is no external connection between the gates of the switches and the bases of the transistors. These components are formed in common so that they are connected to one another internally.

It is a significant advantage of this invention to have the anodes and emitters in common and also to have the gates 21–23 in common with the bases 35–37, respectively, since having these components in common results in a much more compact structure and eliminates interconnections. A compact structure such as this is desirable because it lessens the chances for defects such as pinholes in the oxide protection layer by decreasing the physical size of the structure and lessens the possibility of defects in interconnections by eliminating the need for many interconnections. An epitaxial structure is not essential to this invention. Alternative integrated structures which could also be used are shown in a patent to Alva I. Archer 3,309,537.

The next step in forming the structure is to diffuse P-type impurities into the silicon to form heavily doped P-type (P+) zones, areas, layers, or regions. Layer or gate 24 of switch 10 is diffused into gate 21; gate 25 of switch 11 is diffused into gate 22; and layer or gate 26 of switch 12 is diffused into gate 23. Similarly, layer or collector 40 of transistor 13 is diffused into base 35; layer or collector 41 of transistor 14 is diffused into base 36; and layer or collector 42 of transistor 15 is diffused into base 37. During this same step a heavily doped P-type zone, area, or region is formed around each of N-type regions 56, 57, and 60. The purpose of these heavily doped P-type regions is to prevent surface impurities from causing a surface layer of N-type or intrinsic semiconductor material from being formed. Region 61 surrounds N-type region 56; region 62 surrounds N-type region 57; and region 63 surrounds N-type region 60.

The final step in forming the integrated structure is to diffuse N-type impurities into gates 24, 25, and 26 to form heavily doped (N+) zones, regions, areas, layers, or cathodes 27, 30, and 31 of switches 10, 11, and 12, respectively. Details such as the surface oxide layer have been omitted from the drawings for clarity. Such details will be evident to those skilled in the art from a reading of the above-referenced Patent 3,309,537. Those skilled in the art will realize that the dimensions of the structure shown in FIGURES 2 and 3 have been exaggerated for clarity. Specifically, the depths of the various diffusions have been expanded.

In FIGURE 3 a positive source 43 is shown connected to the P-type regions 52–55 by means of a resistor 44. Terminals 45, 46, and 47 are connected to cathodes 27, 30 and 31, respectively. These details and connections are not shown in FIGURE 2 for clarity. A contact 64 is made to collector 40 and is connected by means of a conductor 65 to a contact 66 on gate 25. A contact 67 is made to collector 41 and is connected by means of a conductor 70 to a contact 71 on gate 26. Terminal 50 is connected by means of a conductor 72 to a contact 73 on gate 24 and to a contact 74 on collector 42. The conductors and contacts to the various regions are shown schematically for clarity in FIGURE 3 and not as they would actually appear.

Since FIGURE 1 is generally a circuit schematic of the structure of FIGURES 2 and 3, the operation of the structure of FIGURES 2 and 3 is substantially the same as the operation in FIGURE 1. Thus, a description of the operation of the structure will not be repeated here.

FIGURE 4

Figure 4:
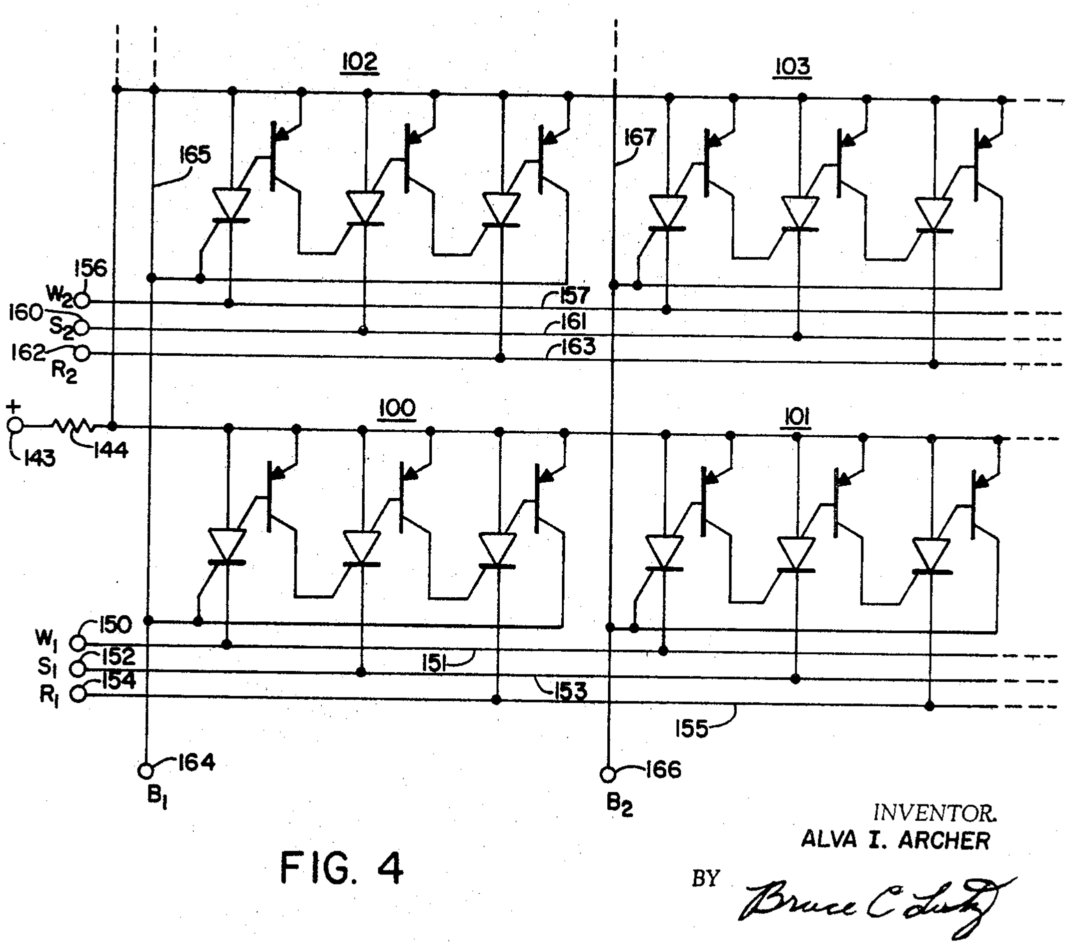
FIGURE 4 is a circuit schematic of four memory locations connected in a 2 x 2 array.

FIGURE 4 shows a 2 x 2 array of memory locations, cells, or bits. Each of the memory bits is the same as the structure shown in FIGURES 1–3. In FIGURE 4 there is shown memory locations 100, 101, 102, and 103. The array can be extended in either direction to make any size array desired. A positive source 143 is connected by means of a resistor 144 to the anodes of the switches and to the emitters of the transistors which make up locations 100–103. The details of the memory locations will not be gone into in describing FIGURE 4 because the structure and operation is the same as that shown and described for FIGURES 1–3. A terminal 150 labeled $W_1$ is connected to a write conductor 151 which in turn is connected to the cathodes of switches in locations 100 and 101 which correspond to switch 10 of FIGURE 1. A terminal 152 labeled $S_1$ is connected to a store conductor 153 which is in turn connected to the anodes of the switches of locations 100 and 101 which correspond to switch 11 of FIGURE 1. A terminal 154 labeled $R_1$ is connected to a read conductor 155 which is in turn connected to the cathodes of switches in locations 100 and 101 which correspond to switch 12 of FIGURE 1.

A terminal 156 labeled $W_2$ is connected to a write conductor 157 which in turn is connected to the cathodes of switches in locations 102 and 103 which correspond to switch 10 of FIGURE 1. A terminal 160 labeled $S_2$ is connected to a store conductor 161 which in turn is connected to the cathodes of switches in locations 102 and 103 which correspond to switch 11 of FIGURE 1. A terminal 162 labeled $R_2$ is connected to a read conductor 163 which is in turn connected to the cathode of switches in locations 102 and 103 which correspond to switch 12 of FIGURE 1.

A terminal 164 labeled $B_1$ is connected to a bit connected to a bit conductor 165 which is in turn connected to the gates of switches in locations 100 and 102 which correspond to gate 24 of switch 10 of FIGURE 1 and which are further connected to collectors of transistors in locations 100 and 102 which correspond to transistor 15 of FIGURE 1. A terminal 166 labeled $B_2$ is connected to a bit conductor 167 which is in turn connected to gates of switches in locations 101 and 103 which correspond to gate 24 of switch 10 of FIGURE 1 and which are further connected to collectors of transistors in locations 101 and 103 which correspond to transistor 15 of FIGURE 1.

In the arrangement shown in FIGURE 4 locations 100 and 101 may be considered two bits of a first word and locations 102 and 103 may be considered two bits of a second word. When information is being stored, terminals 152 and 160 are grounded so that the switches connected thereto are able to conduct if a "1" is being stored. To erase a word stored in locations 100 and 101, terminal 152 is open circuited or made positive to extinguish the conduction of switches connected to conductor 153.

To write information into locations 100 and 101, terminal 150 is grounded. If a "1" is to be stored in location 100, terminal 164 is raised to a positive potential sufficient to cause the first switch in location 100 to conduct. If a "1" is to be stored in location 101, terminal 166 is raised to a positive potential sufficient to cause the first switch in location 101 to conduct. On the other hand, if "0" is to be stored in either location 100 or location 101, the corresponding bit terminal 164 or 166 remains grounded so that the switch corresponding to switch 10 of FIGURE 1 does not conduct. The next step in writing is to ground terminal 152 so that the switches connected thereto can conduct if a "1" is being stored. Terminal 150 is then open circuited or made positive to extinguish the switches connected to conductor 151.

To read information from locations 100 and 101, terminal 154 is grounded so that the switches connected to conductor 155 conduct if a "1" is stored in the particular memory location. If a "1" is stored in location 100, the output transistor will conduct thereby raising the potential of terminal 164. If a "1" is stored in location 101 the output transistor will conduct thereby raising the potential of terminal 166. If "0" is stored in a particular location, the output transistor of that location does not conduct and the potential of terminal 164 or 166 does not rise.

From the description of the operation of locations 100 and 101, the operation of locations 102 and 103 is evident.

While I have shown and described certain embodiments of my invention, it will be evident to those skilled in the art that various modifications may be made to the specific embodiments shown without departing from the spirit and scope of my invention.

I claim as my invention:

1. A memory device comprising in combination:
first, second, and third pluralities of semiconductor switch means each having a cathode means, an anode means, a first gate means, and a second gate means;
first, second, and third pluralities of current control means each having a control means, an output means, and a common means, said first plurality of current control means being associated each with a corresponding one of said first plurality of semiconductor switch means, said second plurality of current control means being associated each with a corresponding one of said second plurality of semiconductor switch means, and said third plurality of current control means being associated each with a corresponding one of said third plurality of semiconductor switch means;
means connecting said second gate means of each of said semiconductor switch means to said control means of the associated one of said current control means;
means connecting said output means of said first plurality of current control means each to one of said first gate means of a corresponding one of said second plurality of semiconductor switch means;
means connecting said output means of said second plurality of current control means each to one of said first gate means of a corresponding one of said third plurality of semiconductor switch means;
means for supplying energization current connected to said anode means and to said common means;
first conductor means connected to said cathode means of said first, second and third pluralities of semiconductor switch means; and
second conductor means connected to said first gate means of each of said first plurality of semiconductor switch means and to said output means of said third plurality of current control means.

2. A memory device as defined in claim 1 wherein said anode means and said common means comprise a first region of semiconductor material, each of said second gate means together with said control means of said associated ones of said current control means comprise a plurality of second regions of semiconductor material disposed in operable relation to said first region, said output means of said current control means comprise a plurality of third regions of semiconductor material disposed in operable relation to said second regions, said first gate means of said semiconductor switch means comprise a plurality of fourth regions of semiconductor material disposed in operable relation with said second regions, and said cathode means of said semiconductor means comprise a plurality of fifth regions of semiconductor material disposed in operable relation with said fourth regions.

3. Memory apparatus comprising, in combination:
semiconductor means having a plurality of memory locations arranged in rows and columns each of said memory locations having first, second, and third areas, each of said areas having;
a first region of a first conductivity type,
a second region of a second conductivity type,
said first region surrounding said second region and being in electrical contact with said second region, a third region of said first conductivity type surrounded by said second region and isolated from said first region by a first portion of said second region, a fourth region of said first conductivity type sur-surrounded by said second region and isolated from said first region by a second portion of said second region, and a fifth region of said second conductivity type surrounded by said fourth region and isolated from said second region;

potential supplying means connected to said first regions;

means for connecting said third region of each first area to said fourth region of the second area of the same memory location and for connecting said third region of each second area to said fourth region of the third area of the same memory location;

first, second, and third pluralities of conductor means connected to said fifth regions of said first, second, and third areas, respectively;

a fourth plurality of conductor means interconnecting said fourth regions of the first areas of said columns of memory locations, and further interconnecting said third regions of the third areas of said columns of memory locations.

4. Memory apparatus as defined in claim 3 wherein said first regions are in common.

5. Memory apparatus as defined in claim 4 wherein each of said areas additionally includes a sixth region of said first conductivity type at the surface of said semiconductor means and disposed partially between said first and second regions, said sixth region having a relatively high impurity concentration with respect to said first region.

6. Memory apparatus comprising, in combination:

a plurality of memory locations each having first, second, and third semiconductor switch means and first, second, and third current control means, each of said switch means having anode means, cathode means, input means, and output means, and each of said current control means having control means, common means, and output means, said output means of said first, second and third switch means being interconnected respectively with said control means of said first, second, and third current control means, said output means of said first and second current control means being connected respectively to said input means of said second and third switch means;

energization means connected to said anode means and to said common means;

first conductor means connected to said cathode means of said first switch means;

second conductor means connected to said cathode means of said second switch means;

third conductor means connected to said cathode means of said third switch means;

fourth conductor means connected to said input means of said first switch means;

fifth conductor means connected to said output means of said third current control means;

means connected to said first, second, and third conductor means to selectively energize said cathode means for writing, storing, and reading information in said second switch means; and means connected to said fourth and fifth conductor means for selectively energizing said fourth conductor means to write information in said memory locations and for receiving information on said fifth conductor means.

7. Memory apparatus as defined in claim 6 wherein said memory locations comprise areas of a unitary block of semiconductor, said anode means and said common means being a first common region of said areas, said output means of said first switch means and said control means of said first current control means being a second common region of said areas, said output means of said second switch means and said control means of said second control means being a third common region of said areas, and said output means of said third switch means and said control means of said third current control means being a fourth common region of said areas.

8. Semiconductor apparatus comprising, in combination:

a plurality of semiconductor integrated circuit locations, each of said locations including at least a portion of a unitary block of semiconductive material with first, second, and third four-layer semiconductor devices and first, second, and third semiconductor current controlling means;

means connecting said first device in controlling relation to said first semiconductor means;

means connecting said first semiconductor means in controlling relation to second device;

means connecting said second device in controlling relation to said second semiconductor means;

means connecting said second semiconductor means in controlling relation to said third device;

means connecting said third device in controlling relation to said third semiconductor means;

energization means connected to said first, second, and third devices and to said first, second, and third semiconductor means;

means electrically interconnecting said first devices;

means electrically interconnecting said second devices;

means electrically interconnecting said third devices; and means electrically interconnecting said third semiconductor means.

9. Apparatus as defined in claim 8 wherein one of the layers of said first device is in common with a control means of said first semiconductor means, one of the layers of said second device is in common with a control means of said second semiconductor means, one of the layers of said third device is in common with a control means of said third semiconductor means, and another of said layers of each of said devices is in common with a common means of each of said semiconductor means.

10. Semiconductor apparatus comprising, in combination:

a semiconductor means having a common means and first, second, and third semiconductor devices, each of said devices having first input means, second input means, and output means and further having first and second conducting states;

means for supplying an energization potential connected to said common means;

means connecting said output means of said first device to said first input means of said second device;

means connecting said output means of said second device to said first input means of said third device;

first input signal means connected to said first input means of said first device; second input signal means connected to said second input means of said first device, said first device switching from said first conducting state to said second conducting state upon the coincident occurrence of signals from said first and second input signal means;

third input signal means connected to said second input means of said second device, said second device switching from said first conducting state to said second conducting state upon the coincident occurrence of a signal from said third input signal means and a signal from said output means of said first device indicative of said first device being in said second conducting state;

fourth input signal means connected to said second input means of said third device, said third device switching from said first conducting state to said second conducting state upon the coincident occurrence of a signal from said third input signal means and a signal from said output means of said second device indicative of said second device being in said second conducting state; and output signal means connected to said output means of said third device.

11. Semiconductor apparatus as defined in claim 10 wherein said semiconductor means is at least a portion of a unitary block of semiconductor material.

12. Semiconductor apparatus as defined in claim 11 wherein each of said devices includes a first region in electrical contact with said common means, said common means being of a first conductivity type semiconductor material and said first region being of a second conductivity type semiconductor material;

a second region in electrical contact with said first region, said second region comprising said output means, and being of said first conductivity type semiconductor material;

a third region in electrical contact with said first region, said third region comprising said first input means and being of said first conductivity type semiconductor material; and a fourth region in electrical contact with said third region, said fourth region comprising said second input means and being of said second conductivity type semiconductor material.

References Cited

UNITED STATES PATENTS 3,356,998 12/1967 Kaufman ............ 307—238

MERRELL W. FEARS, Primary Examiner

U.S. Cl. X.R.

307—238